US006135498A

United States Patent [19]

Vlahovic

[11] Patent Number: 6,135,498

[45] Date of Patent: Oct. 24, 2000

[54] MACPHERSON STRUT TOWER FOR PASSENGER CAR AND METHOD OF MAKING SAME

[75] Inventor: Josip Vlahovic, Bietigheim-Bissingen, Germany

[73] Assignee: Dr. Ing. h.c.F. Porsche AG, Weissach, Germany

[21] Appl. No.: 08/889,794

[22] Filed: Jul. 8, 1997

[30] Foreign Application Priority Data

Jul. 30, 1996 [DE] Germany ........................... 196 30 647

[51] Int. Cl.[7] ................................ B60G 7/00; B60P 7/00; B62D 7/00; B62D 7/22

[52] U.S. Cl. .................................... 280/788; 280/124.155

[58] Field of Search .................................... 280/788, 781, 280/124.147, 124.155, 124.15, 124.1; 296/194

[56] References Cited

U.S. PATENT DOCUMENTS

| | | | |
|---|---|---|---|
| 4,618,163 | 10/1986 | Hasler et al. | 280/785 |
| 5,456,517 | 10/1995 | Kalian et al. | 296/194 |
| 5,641,176 | 6/1997 | Alatolo | 280/690 |
| 5,729,463 | 3/1998 | Koenig | 364/468.04 |
| 5,882,039 | 3/1999 | Beckman et al. | 280/781 |

FOREIGN PATENT DOCUMENTS

| | | |
|---|---|---|
| 0 568 251 | 11/1993 | European Pat. Off. . |
| 0 733 542 | 9/1996 | European Pat. Off. . |
| 2 702 710 | 9/1994 | France . |
| 4204825A1 | 6/1993 | Germany . |
| 44 17 380 | 11/1995 | Germany . |
| WO 94/04766 | 3/1994 | WIPO . |

*Primary Examiner*—Lanna Mai
*Assistant Examiner*—Jeffrey J. Restifo
*Attorney, Agent, or Firm*—Evenson, McKeown, Edwards & Lenahan, P.L.L.C.

[57] ABSTRACT

A MacPherson strut tower made in one piece for a motor vehicle, especially an automobile, is permanently connected with at least one adjoining side member of the body structure. The MacPherson strut tower, formed by a hollow body produced by the internal high-pressure shaping method, results in a significant increase in torsional stiffness of the body structure since the two side members and the MacPherson strut tower are assembled to form a three-dimensional supporting structure with continuous closed hollow member sections.

14 Claims, 6 Drawing Sheets

MACPHERSON STRUT TOWER FOR PASSENGER CAR AND METHOD OF MAKING SAME

BACKGROUND AND SUMMARY OF THE INVENTION

This application claims the priority of German application 196 30 647.7 filed in Germany on Jul. 30, 1996, the disclosure of which is expressly incorporated by reference herein.

The invention relates to a MacPherson strut tower for a motor vehicle, especially a passenger car, connected to at least one adjoining side member of the body and permanently connected therewith.

German Patent Document DE-42 04 825 A1 teaches a MacPherson strut tower in the form of an extrusion-molded section for an automobile, with the extrusion-molded section surrounding an adjoining side member formwise at least for a portion of its length, and is additionally connected with the side member by gluing, welding, riveting, or the like.

This arrangement suffers from the disadvantage that the cutoff extrusion-molded section is made open on both sides in the lengthwise direction, so that it has only a low torsional stiffness in the direction of the axis of the MacPherson strut.

The linear connection of the MacPherson strut tower to a single side member and the welded seam, composed of sections running at angles to one another, are not optimal.

An object of the invention is to improve the MacPherson strut towers of a motor vehicle in such fashion that they can not only accept the forces transmitted by the chassis and conduct them into the adjoining body, but can also contribute to a significant increase in the stiffness of the supporting structure.

According to the invention, this object is achieved by providing an arrangement wherein the MacPherson strut tower is formed by a hollow body that is essentially closed and is produced by the internal high-pressure shaping method.

Principal advantages achieved with the invention consist in the fact that the MacPherson strut tower, formed by a one-piece hollow body that extends vertically and is essentially closed, is connected three-dimensionally to an upper side member and a lower side member, with the MacPherson strut tower contributing to a significant increase in rigidity, especially the torsional stiffness of the supporting structure. The hollow body is manufactured in a simple and economical fashion by internal high-pressure shaping. Annular connecting stubs provided endwise on the hollow body are supported externally in matching receptacles in the side members and are also permanently linked by welding with the adjoining side members, producing a welded seam without corners.

The hollow body, viewed in cross section, can have areas of different wall thickness, with the wall thickness being adaptable to the stresses that develop and thus contributing to weight optimization.

There is also a possibility of connecting the two MacPherson strut towers together in the upper area by a beam-like connecting part running crosswise, with the connecting part being made in one piece with the two MacPherson strut towers and produced by internal high-pressure shaping of a blank. This results in further stiffening of the supporting structure of the motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
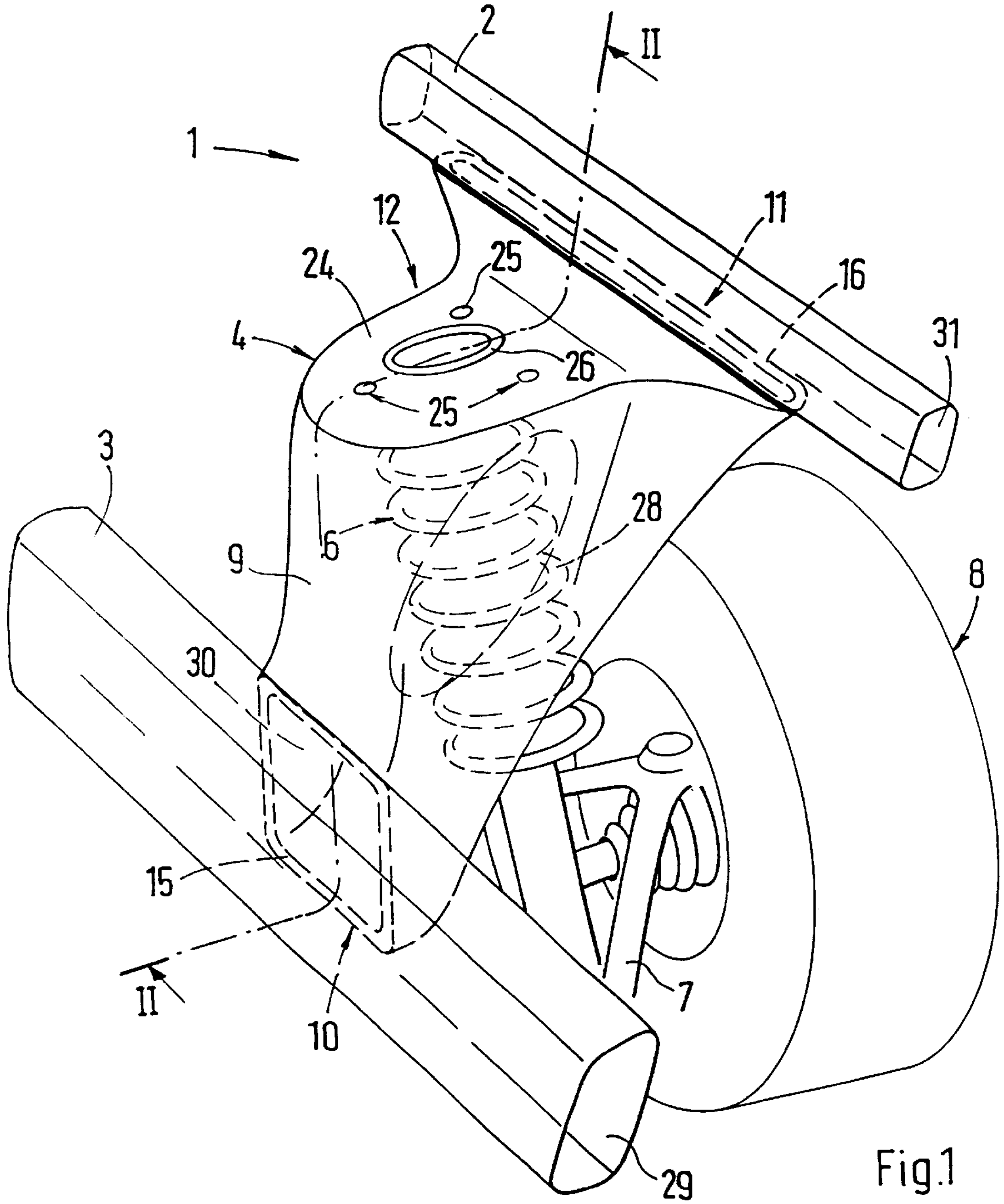
FIG. 1 is a perspective view of a partial area of a supporting structure of a motor vehicle with a MacPherson strut tower constructed according to a preferred embodiment of the present invention.

FIG. 1 shows a partial area of an endwise supporting structure 1 of a motor vehicle, said structure being composed of an upper side member 2, a lower side member 3, and a MacPherson strut tower 4. Supporting structure 1 can be provided in the front and/or rear area of the motor vehicle.

The two side members 2, 3 are arranged offset with respect to one another in the vertical direction and in the transverse direction, with upper side member 2, viewed in the transverse direction, extending further outward than lower side member 3. The upper end 5 of a MacPherson strut 6 is fastened in conventional fashion to MacPherson strut tower 4. The lower end of the MacPherson strut is connected for example to a wheel location member 7 of an adjoining wheel 8. The embodiment shows a MacPherson strut with an upper spring element 28.

According to the invention, MacPherson strut tower 4 is formed by an essentially closed hollow body 9 made of steel or light metal produced by the internal high-pressure shaping method. A first open end area 10 of elongated hollow body 9 is connected to lower side member 3 and the other open end area 11 of hollow body 9 is connected to upper side member 2 in such fashion that the two side members 2, 3 and MacPherson strut tower 4 form a closed three-dimensional supporting connection 12 with essentially closed hollow supporting sections 29, 30, 31.

Figure 2:
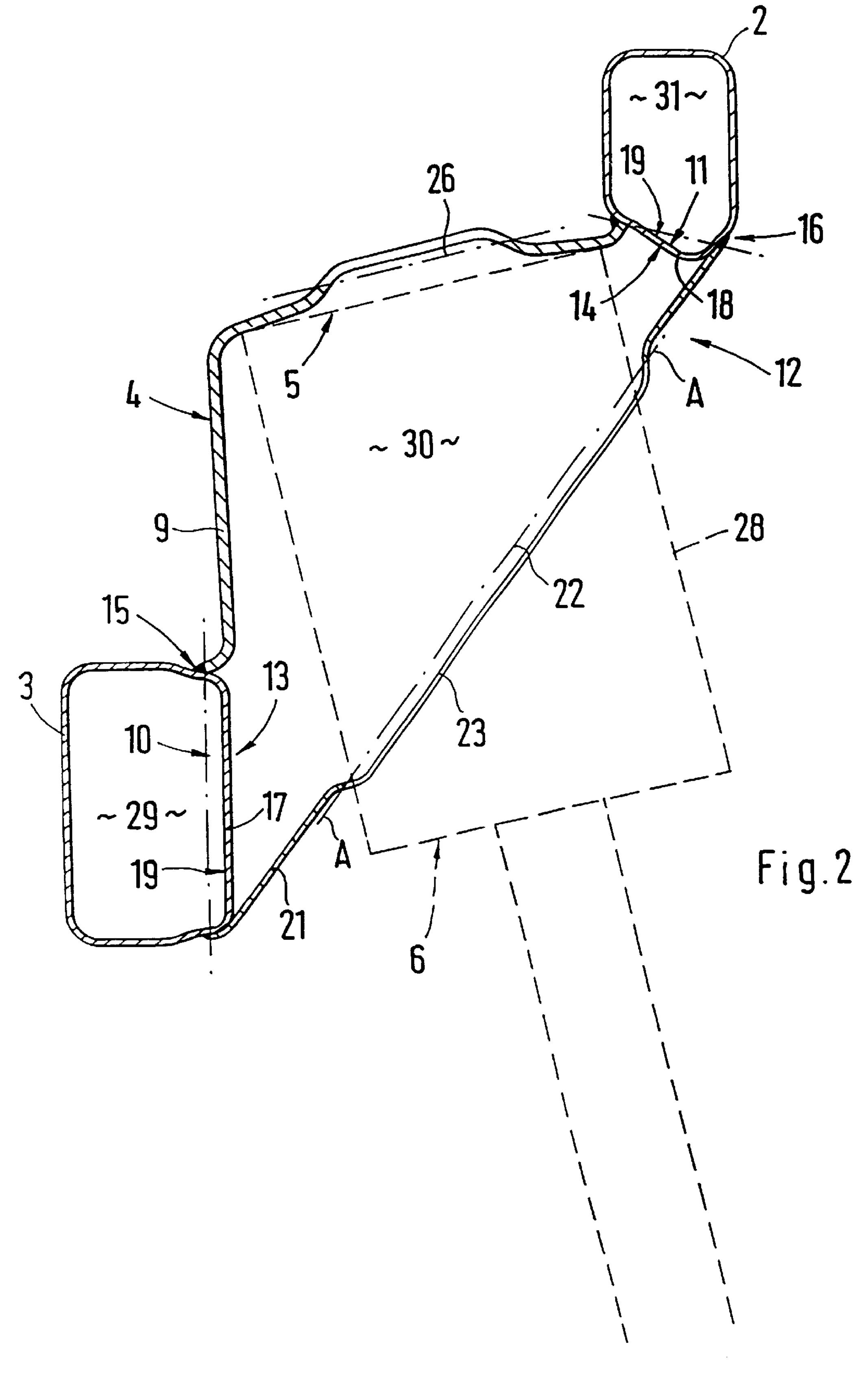
FIG. 2 is a vertical section through the MacPherson strut tower according to FIG. 1.

According to FIGS. 1 and 2, hollow body 9 has its end area 10 resting on the inner outer side 13 of lower side member 3 and is permanently connected with the latter, while the other end area 11 of hollow body 9 is connected to underside 14 of upper. side member 2. Annular connecting stubs 15, 16 are formed at both end areas 10, 11 of hollow body 9, said stubs cooperating formwise with matching receptacles 17, 18 of side members 2, 3 and additionally held in place by welding, gluing or the like.

According to FIG. 2, projecting flat bulges 19 are formed on side members 2, 3, said bulges being adapted to the shape of connecting stubs 15, 16 of hollow body 9 that surround them. However, there is also a provision for providing circumferential collar-like receiving flanges instead of bulges 19 on side members 2, 3, on which flanges connecting stubs 15, 16 rest externally.

Upper and lower side members 2, 3 are preferably also made as hydroformed parts (parts made by the internal high-pressure shaping method). Connecting stubs 15, 16 can be made with a plane or saddle shape at the ends, with the latter design producing an optimum connection to side members 2, 3.

A circumferential continuous welded seam is provided between connecting stubs 15, 16 of hollow body 9 and side members 2 and 3, or locally opposite welded seam sections are provided but no welded seams that are bent at an angle or are zig-zag shaped.

Figure 3:
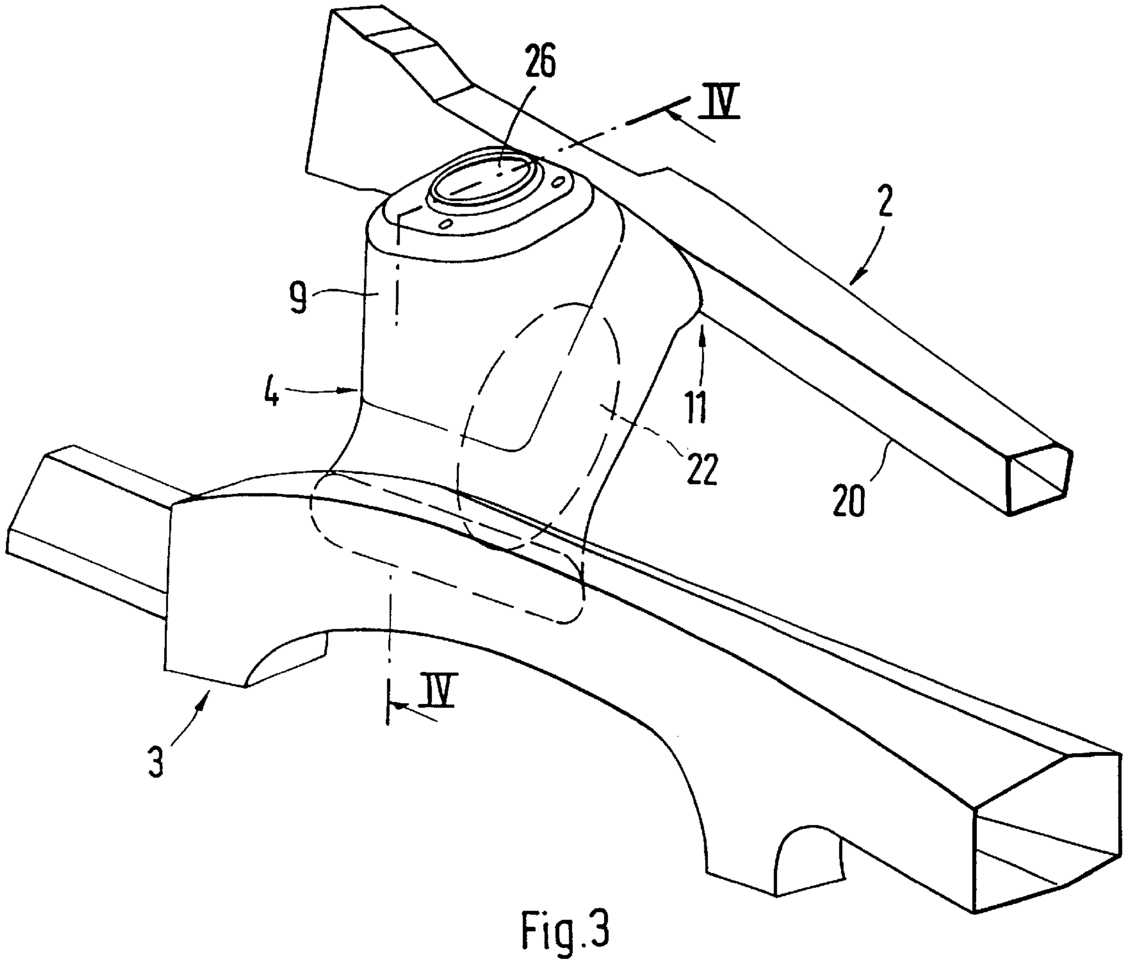
FIG. 3 is a perspective view of another embodiment of a supporting structure with a MacPherson strut tower.

According to FIG. 3, the upper end area 11 of hollow body 9 that forms MacPherson strut tower 4 is connected to the inside 20 of upper side member 2. The connection of lower end area lo is made as shown in FIGS. 1 and 2.

The vertical hollow body 9 that is produced in a tool by internal high-pressure shaping of a preshaped blank 21 has cross sections that change constantly along its length or in the vertical direction. To secure the upper end 5 of MacPherson strut 6, through bores 25 are provided locally on a flat supporting area 24 for threaded bolts as well as a central recess 26.

Figure 4:
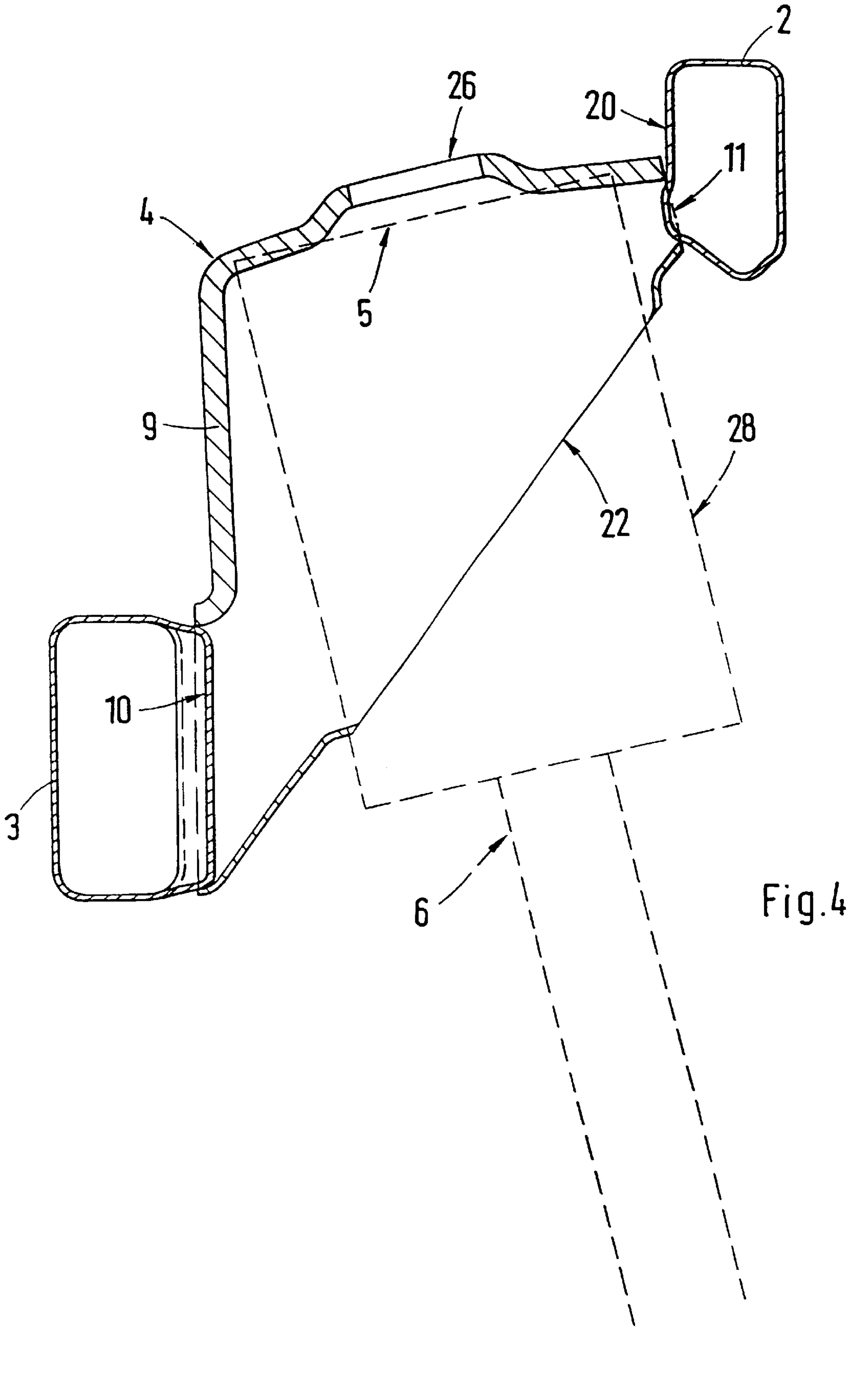
FIG. 4 is a section along line IV—IV in FIG. 3 on an enlarged scale.

Hollow body 9 can have either a constant wall thickness or a wall thickness that varies and is adapted to the forces that develop (see FIGS. 2 and 4).

To insert MacPherson strut 6, following internal high-pressure shaping, an opening 22 is made in one vertical wall 21 of hollow body 9. This opening can be formed for example by cutting off a projection 23 formed during internal high-pressure shaping (see cutting line A—A).

Figure 5:
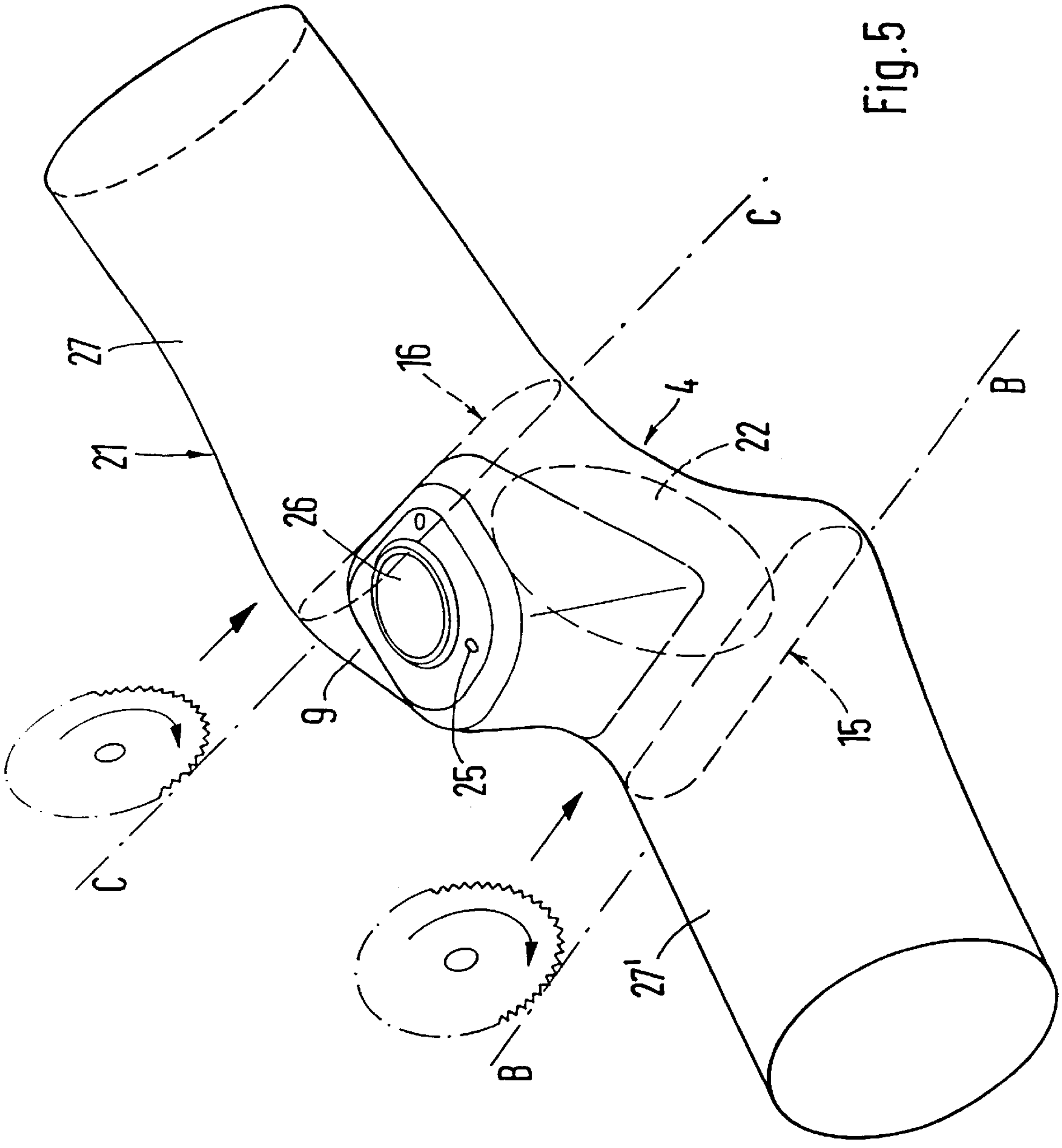
FIG. 5 is a perspective view through a MacPherson strut tower produced by internal high-pressure shaping and showing a cutting process in accordance with preferred embodiments of the present invention.

Pre-bent blank 21, after internal high-pressure shaping, is cut off along cutting lines B—B and C—C, with end pieces 27, 27' being separated from hollow body 9, as shown in FIG. 5.

Figure 6:
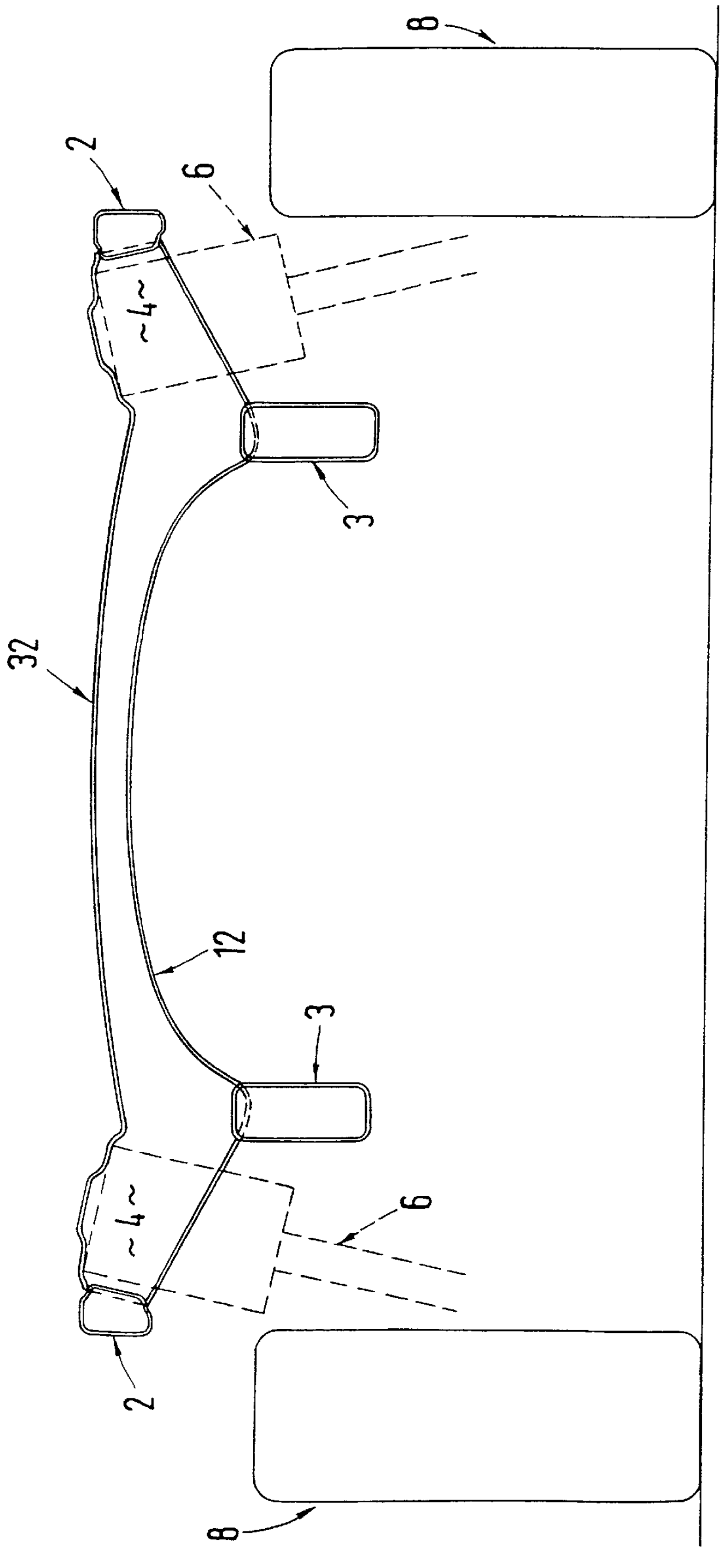
FIG. 6 is a front view of two MacPherson strut towers joined together by a connecting element running crosswise, constructed according to preferred embodiments of the present invention.

Provision is made according to FIG. 6 such that the two opposite MacPherson strut towers 4, 41 are joined together by a connecting part 32 that runs crosswise, with connecting part :32 being made integral with the two MacPherson strut towers 4, 4' and produced by internal high-pressure shaping of a tubular starting part (blank).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. MacPherson strut tower for a motor vehicle, comprising a hollow, essentially closed, single piece MacPherson strut tower produced by an internal high pressure shaping adapted to be permanently connected with at least one adjoining side member of vehicle body structure, wherein one open end area of the hollow body is adapted to be connected to a vehicle body lower side member and opposite open end area of the hollow body is adapted to be connected to a vehicle body upper side member, and wherein the MacPherson strut tower has closed hollow member sections forming a three-dimensional supporting connection with the adjoining side members.

2. MacPherson strut tower according to claim 1, further wherein the hollow body has annular endwise connecting stubs that cooperate shapewise with matching receptacles of the side members and are additionally permanently connected with the side members.

3. MacPherson strut tower according to claim 2, further wherein the receptacles on the side members are each formed by a projecting bulge adapted to a shape of the respective connecting stub of the hollow body that surrounds the bulge.

4. MacPherson strut tower according to claim 2, further wherein the receptacles on the side members are each formed by a projecting collar-like receiving flange on which connecting stubs of the hollow body rest.

5. MacPherson strut tower according to claim 1, further wherein the hollow body has an opening through which a MacPherson strut may be positioned.

6. MacPherson strut tower according to claim 1, wherein the upper and lower side members are hollow and are produced by hydroforming.

7. MacPherson strut tower according to claim 2, wherein the upper and lower side members are hollow and are produced by internal high-pressure shaping.

8. MacPherson strut tower according to claim 3, wherein the upper and lower side members are hollow and are produced by internal high-pressure shaping.

9. MacPherson strut tower according to claim 4, wherein the upper and lower side members are hollow and are produced by internal high-pressure shaping.

10. MacPherson strut tower according to claim 7, further comprising an integral connecting part adapted to integrally connect two of said similar opposite MacPherson strut towers, said connecting part extending crosswise, said connecting part being made integral with the two MacPherson strut towers and produced by internal high-pressure shaping of a tubular starting part.

11. MacPherson strut tower according to claim 2, further comprising an integral connecting part adapted to integrally connect two of said similar opposite MacPherson strut towers, said connecting part extending crosswise, said connecting part being made integral with the two MacPherson strut towers and produced by internal high-pressure shaping of a tubular starting part.

12. MacPherson strut tower according to claim 3, further comprising an integral connecting part adapted to integrally connect two of said similar opposite MacPherson strut towers, said connecting part extending crosswise, said connecting part being made integral with the two MacPherson strut towers and produced by internal high-pressure shaping of a tubular starting part.

13. MacPherson strut tower according to claim 4, further comprising an integral connecting part adapted to integrally connect two of said similar opposite MacPherson strut towers, said connecting part extending crosswise, said connecting part being made integral with the two MacPherson strut towers and produced by internal high-pressure shaping of a tubular starting part.

14. MacPherson strut tower according to claim 5, further comprising an integral connecting part adapted to integrally connect two of said similar opposite MacPherson strut towers, said connecting part extending crosswise, said connecting part being made integral with the two MacPherson strut towers and produced by internal high-pressure shaping of a tubular starting part.

* * * * *